United States Patent

[11] 3,626,508

| | | | |
|---|---|---|---|
| [72] | Inventor | Clarence C. Sharrow |  |
| | | 121-11th Ave. South, South St. Paul, Minn. 55101 | |
| [21] | Appl. No. | 71,296 | |
| [22] | Filed | Sept. 11, 1970 | |
| [45] | Patented | Dec. 7, 1971 | |

[54] CONCRETE PIPE LIFTING CONNECTOR
4 Claims, 5 Drawing Figs.

[52] U.S. Cl................................................ 294/89, 24/123 A
[51] Int. Cl.......................................................... F16g 11/00
[50] Field of Search.......................................... 294/89, 91; 214/1 P, 1 PA; 24/116 A, 123 A, 123 E, 128 R; 52/122, 124

[56] References Cited
UNITED STATES PATENTS

| 109,463 | 11/1870 | Smith | 294/91 |
| 3,429,607 | 2/1969 | White | 294/89 |

Primary Examiner—Richard E. Aegerter
Assistant Examiner—I. Kenneth Silverman
Attorney—Stryker and Jacobson ABSTRACT: A quick attach and release connector for lifting heavy objects such as sewer pipes in which a slotted plate slides over a steel cable and is retained in place by a sleeve on the cable which is prevented from leaving the slot in the plate by a retaining rim on the plate.

PATENTED DEC 7 1971 3,626,508
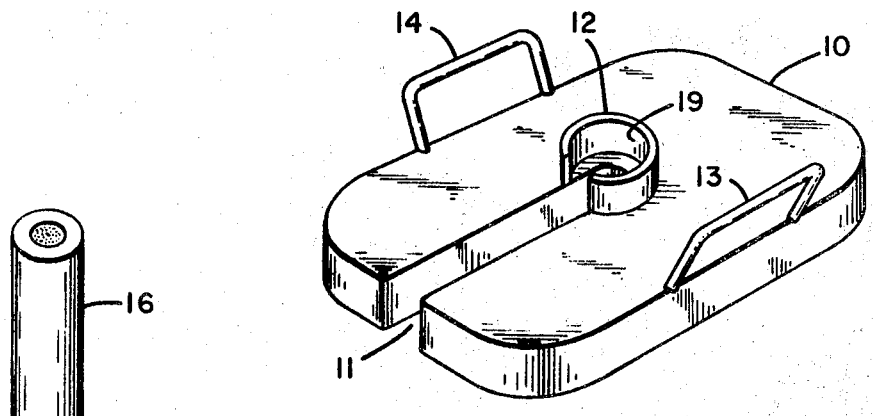
Fig. 1b
Fig. 1a
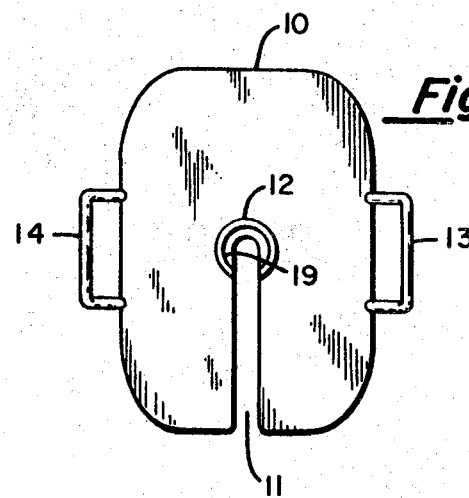
Fig. 2
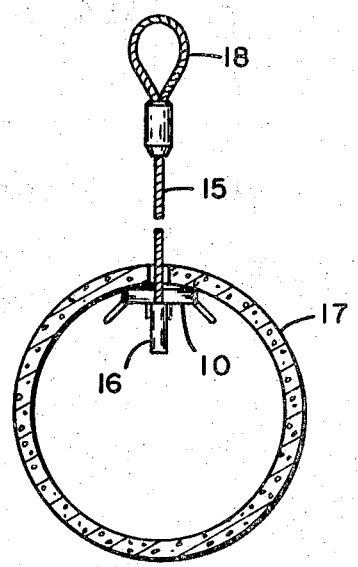
Fig. 3
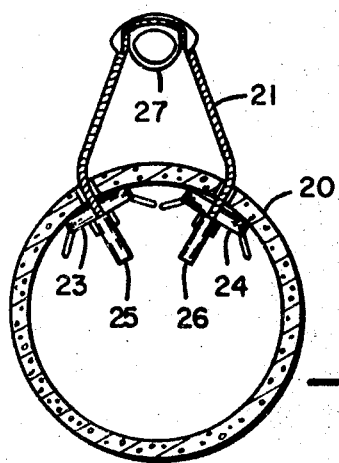
Fig. 4
INVENTOR
CLARENCE C. SHARROW
BY Stryker and Jacobson
ATTORNEYS

CONCRETE PIPE LIFTING CONNECTOR

BACKGROUND OF THE INVENTION

Sewer pipe today is generally of the preformed concrete type and individual pieces often weigh many tons. In the prior art each of these pieces is lifted by a derrick and connections to the pipe are effected by inserting a threaded steel bolt into the sewer pipe and through a retaining plate inside the pipe. A large nut is then screwed onto the threaded bolt by hand. A special hook is then used to connect the steel cable from the derrick to an eye in the end of the threaded bolt so that the pipe may be lifted. Numerous problems surround this prior art approach which cause it to be time consuming, clumsy, and expensive since heavy pipes are often dropped and broken. One problem involves the threads on the bolt which often get dirty or damaged so that it is very difficult to thread the large nut onto the bolt by mere hand power alone. Thus, it becomes necessary to employ large wrenches which are difficult to lift and work with. Another problem involves the position of the hole in the sewer pipe which is rarely if ever straight up when the pipe is left lying on the ground. Therefore, when the derrick first lifts the pipe by the inclined bolt the bolt is often caused to bend thus making future insertion of the bolt into a different pipe very difficult. In addition, after the bolt has been bent a few times it becomes weakened and often snaps suddenly dropping the concrete pipe to the ground. This of course is extremely hazardous to personnel working nearby and invariably breaks the expensive concrete pipe. Another problem commonly encountered is that while the derrick is lifting the pipe, the pipe will start to spin causing the bolt to unthread itself and once again allow the pipe to drop causing a hazard and extensive damage. Still another problem involves the length of the bolt itself. Extremely long bolts are very impractical for obvious reasons so that concrete pipes with very thick walls are difficult to handle. All of the above problems are emphasized by an extremely long bolt with long threads. The only solution in the prior art is to use a wide variety of bolts of different lengths which necessitates even more wasted time in selecting a bolt of the correct length for the particular piece of pipe being handled at that moment. Projects of this sort often involve a variety of sizes of pipes of different thicknesses and weights and a quickly adaptable connector that does not wear out or break, is easy to install, and safe against accidental dropping is highly desirable. My invention provides all of the above objectives.

SUMMARY OF THE INVENTION

Briefly, the heavy object lifting connector of the present invention comprises a steel cable with a loop on one end and a pressed on sleeve on the other end. This cable may be easily constructed to be several feet long and can be slipped through any length hole quite easily by a single man. When the sleeved end emerges inside the pipe, the cable is inserted into a slot in a plate and the sleeve into a retaining rim on the back of the plate. The derrick then may engage the looped end of the cable and lift the pipe with no fear of the sleeve slipping out of the backing plate. It is not necessary to worry about any damaged threads. The plate may be quickly inserted onto the steel cable and quickly removed by one man with a minimum of trouble. One piece of cable suffices for many different sizes of pipes and lengths of holes. If the pipe is crooked when it is lifted, the cable simply flexes into the proper position. Bending action does not tend to weaken a cable. Since the device cannot unscrew itself and the cable won't break, pipes are never dropped and the hazard and expense are eliminated. Furthermore, cable has an inherent safety feature in that if it ever does weaken, it does so one strand at a time thus giving all the workers ample warning that the cable needs to be replaced. Actual experimentation with the preferred embodiment has shown that this connecting technique is so superior to that used in the prior art that five times as many pipes have been handled as could be handled by the prior art method. It is therefore apparent that it is an object of my invention to provide an improved connector for lifting heavy objects. It is another object of my invention to provide such a connector which will not accidentally release or break, which is adaptable to a variety of sizes, and which may be attached and released quickly and easily by one man with no tools. Further objects and advantages will become apparent from the following description and drawings.

BRIEF DESCRIPTION OF THE DRAWING

FIG. 1a and 1b respectively show in perspective the retaining plate and the sleeved end of the cable which engages the retaining plate.

FIG. 2 is a top view of the plate shown in FIG. 1a.

FIG. 3 is a sectional view of a piece of concrete sewer pipe with the entire connecting device inserted therethrough in a lifting position.

FIG. 4 shows a variation of the present invention in which the loop passes through the pipe in two places to engage two retaining plates designed according to the present invention.

DESCRIPTION OF THE PREFERRED EMBODIMENT

In FIG. 1a the retaining plate 10 is shown having a slot 11 extending in from one side. A raised circular retaining rim is welded onto plate 10 about the end of slot 11. As can be seen in FIG. 3 the cable comprises a shank portion 15 terminated by a loop 18 at one end and a sleeve 16 press fitted over the other end. Shank 15 is made conveniently long so that sleeved end 16 can be inserted through a hole in any sized concrete pipe such as pipe 17. The shank is simply inserted far enough into the hole so that plate 10 can be slipped over cable 15 by inserting cable 15 into slot 11. When cable 15 reaches the end of the slot the retaining plate 10 is lowered so that sleeve 16 slides into rim 12 and rests against surface 19 on plate 10. In this position the weight of the plate 10 and the object being lifted insures that sleeve 16 cannot back out of rim 12 and as long as sleeve 16 is in rim 12 cable 15 cannot slide out of slot 11.

In FIG. 2 the relative arrangements of parts is further clarified by a top view. A pair of handles 13 and 14 are welded on plate 10 in the preferred embodiment in order to make it more easy to handle by one man.

Turning to FIG. 4 an alternate embodiment of the present invention may be seen. Some heavy sewer pipes are provided with two smaller holes at one end which are typically used for sliding a piece of pipe into an abutting relationship with the next piece of pipe to which it is to be connected. For this purpose a cable loop 21 is utilized having a pair of sleeves 25 and 26 one at each end. The cable is inserted through the two holes in pipe 20 and retained in place by two retaining plates 23 and 24. The cable then may be lifted directly by grasping it with a hook on a derrick or it may be passed through a guide 27 which is in turn grasped by the hook on the derrick.

It should be pointed out that a number of variations are possible without departing from the spirit and scope of the present invention. For example, any size cable can be used and any size retaining plate 10 may be used depending on the particular job contemplated. Also the type of handles shown are preferred only and a wide variety may be equally well employed. The shape of plate 10 is not critical as long as it serves to provide a suitable resting surface for the heavy object being lifted.

I claim:

1. A concrete pipe lifting connector comprising in combination:

a steel cable having a lifting end with a sleeve pressed thereon, said sleeve dimensioned to pass through a hole in the pipe and said cable long enough to permit the sleeve to pass through different lengths of holes;

a slotted retainer plate of size substantially larger than said sleeve, said slot just wide enough to permit entry of said cable but not said sleeve; and a raised rim surrounding the end of said slot of a shape and size sufficient to engage said sleeve and prevent said sleeve from moving laterally out of said slot.

2. The apparatus of claim 1 wherein said raised rim is circular and said sleeve is circular so as to fit inside said rim and said rim has a slot in the side of it of the same width as the slot in said plate.

3. The apparatus of claim 2 including lifting handles on said plate.

4. The apparatus of claim 2 in which said steel cable has two lifting ends, each with a sleeve designed to engage a slotted plate with a retainer rim on it.

* * * * *